(12) United States Patent
Kowalski

(10) Patent No.: US 7,708,792 B2
(45) Date of Patent: May 4, 2010

(54) AIR INLET ASSEMBLY

(75) Inventor: Gregory J Kowalski, Sanborn, NY (US)

(73) Assignee: Delphi Technologies, Inc., Troy, MI (US)

( * ) Notice: Subject to any disclaimer, the term of this patent is extended or adjusted under 35 U.S.C. 154(b) by 935 days.

(21) Appl. No.: 11/501,386

(22) Filed: Aug. 9, 2006

(65) Prior Publication Data

US 2007/0157586 A1 Jul. 12, 2007

Related U.S. Application Data

(60) Provisional application No. 60/758,368, filed on Jan. 12, 2006.

(51) Int. Cl.
*B01D 46/00* (2006.01)
(52) U.S. Cl. .......................... 55/385.3; 55/420; 55/422; 55/467; 55/471; 454/158
(58) Field of Classification Search ................ 55/385.1, 55/385.3, 472, 473, 471, DIG. 21, DIG. 32, 55/490.1, 502, 312, 417–422; 96/384, 381, 96/397, 399; 60/274, 303, 311; 123/198 E; 454/156, 158
See application file for complete search history.

(56) References Cited

U.S. PATENT DOCUMENTS

| | | | | |
|---|---|---|---|---|
| 5,347,809 A | * | 9/1994 | Moeckel et al. | ............... 60/274 |
| 5,762,689 A | * | 6/1998 | Hunziker | ..................... 95/280 |
| 5,876,277 A | | 3/1999 | Uemura et al. | |
| 5,879,230 A | | 3/1999 | Wardlaw et al. | |
| 5,904,742 A | * | 5/1999 | Teay | ........................... 55/311 |
| 6,361,590 B1 | * | 3/2002 | Gilbert et al. | ................ 96/384 |
| 6,726,456 B2 | * | 4/2004 | Hayashi et al. | ............. 417/313 |
| 2001/0005985 A1 | * | 7/2001 | Schueler | ................... 55/385.3 |

FOREIGN PATENT DOCUMENTS

| | | |
|---|---|---|
| DE | 19804034 | 8/1998 |
| EP | 0504586 | 9/1992 |
| FR | 2761014 | 9/1998 |

OTHER PUBLICATIONS

European Search Report dated Mar. 20, 2007.

* cited by examiner

*Primary Examiner*—Duane Smith
*Assistant Examiner*—Minh-Chau T Pham
(74) *Attorney, Agent, or Firm*—Patrick M. Griffin

(57) ABSTRACT

An air inlet assembly for an automotive heating and ventilating air conditioning (HVAC) system includes a casing extending along an axis (A). The casing defines a plurality of inlets for receiving air and an outlet for delivering air from the inlets. A filter filters air between the inlets and the outlet. An air moving device disposed about the outlet for expelling air from the casing. A valve mechanism supports the filter. Furthermore, the valve mechanism moves along the axis (A) between an outside-air position and a cabin-air position for controlling air from the inlets to the outlet.

22 Claims, 7 Drawing Sheets

AIR INLET ASSEMBLY

RELATED APPLICATIONS

This application claims the benefit of provisional application No. 60/758,368, filed Jan. 12, 2006.

BACKGROUND OF THE INVENTION

1. Field of the Invention

The subject invention relates to an air inlet assembly for an automotive vehicle heating and ventilating air conditioning (HVAC) system.

2. Description of the Prior Art

Traditional air inlet assemblies used in heating and ventilating air conditioning (HVAC) systems include a housing that defines a plurality of inlets for receiving air and a circular outlet for delivering air from the inlets to a cabin compartment (not shown) of a vehicle (not shown). A fan is typically disposed near the outlet for expelling air from the housing.

An end-torque valve is traditionally disposed between the inlets and upstream from the outlet. The end-torque valve generally pivots between various positions for controlling air from the inlets to the outlet, as shown in FIG. 1. Specifically, the end-torque valve generally seals airflow from a cabin-air inlet and delivers outside air from an outside-air inlet to the cabin through the outlet while in an open-air position. Similarly, the end-torque valve generally seals airflow from the outside-air inlet and delivers cabin air from the cabin-air inlet to the cabin through the outlet while in a cabin-air position. A driver of the vehicle typically selects the position of the end-torque valve to obtain the desired airflow into the vehicle cabin.

Traditionally, a separate rectangular filter for filtering the air covers the circular outlet and is disposed downstream from the inlets and the valve mechanism. Current air inlet assemblies require the rectangular filter to be disposed at least one inch from the fan in order to properly deliver air to the vehicle cabin. The required minimum distance limits reducing the size of the air inlet filter. Additionally, air flow is generally concentrated at the area of the rectangular filter located near the circular outlet. Accordingly, the corner portions of the rectangular filter receive little airflow and the rectangular filter is not utilized efficiently. Furthermore, the traditional end-torque valve limits reducing the overall package of the air inlet assembly.

Therefore, it is desirable to provide a low profile design to reduce overall packaging while optimally filter airflow to the vehicle cabin.

SUMMARY OF THE INVENTION AND ADVANTAGES

The invention provides an air inlet assembly for controlling airflow in an automotive heating and ventilating air conditioning (HVAC) system. The air inlet assembly comprises a casing extending along an axis and defining a plurality of inlets for receiving air and an outlet for delivering air from the inlets. A filter filters air between the inlets and the outlet. An air moving device is disposed about the outlet for expelling air from the casing. The invention is distinguished by a valve mechanism supporting the filter. The valve mechanism is moveable along the axis between an outside-air position and a cabin-air position for controlling air from the inlets to the outlet. A fan can be disposed near the outlet to expel air from the casing.

By combining the filter with the valve mechanism, the air assembly is not limited by the distance at which the filter is located from a fan. Accordingly, the size of the air inlet assembly can be reduced. Additionally, combining the filter with the valve mechanism optimizes the usable surface area of the filter and reduces the filter material required to properly filter airflow. Furthermore, moving the valve mechanism along the axis increases airflow control and achieves more efficient airflow to the cabin area.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
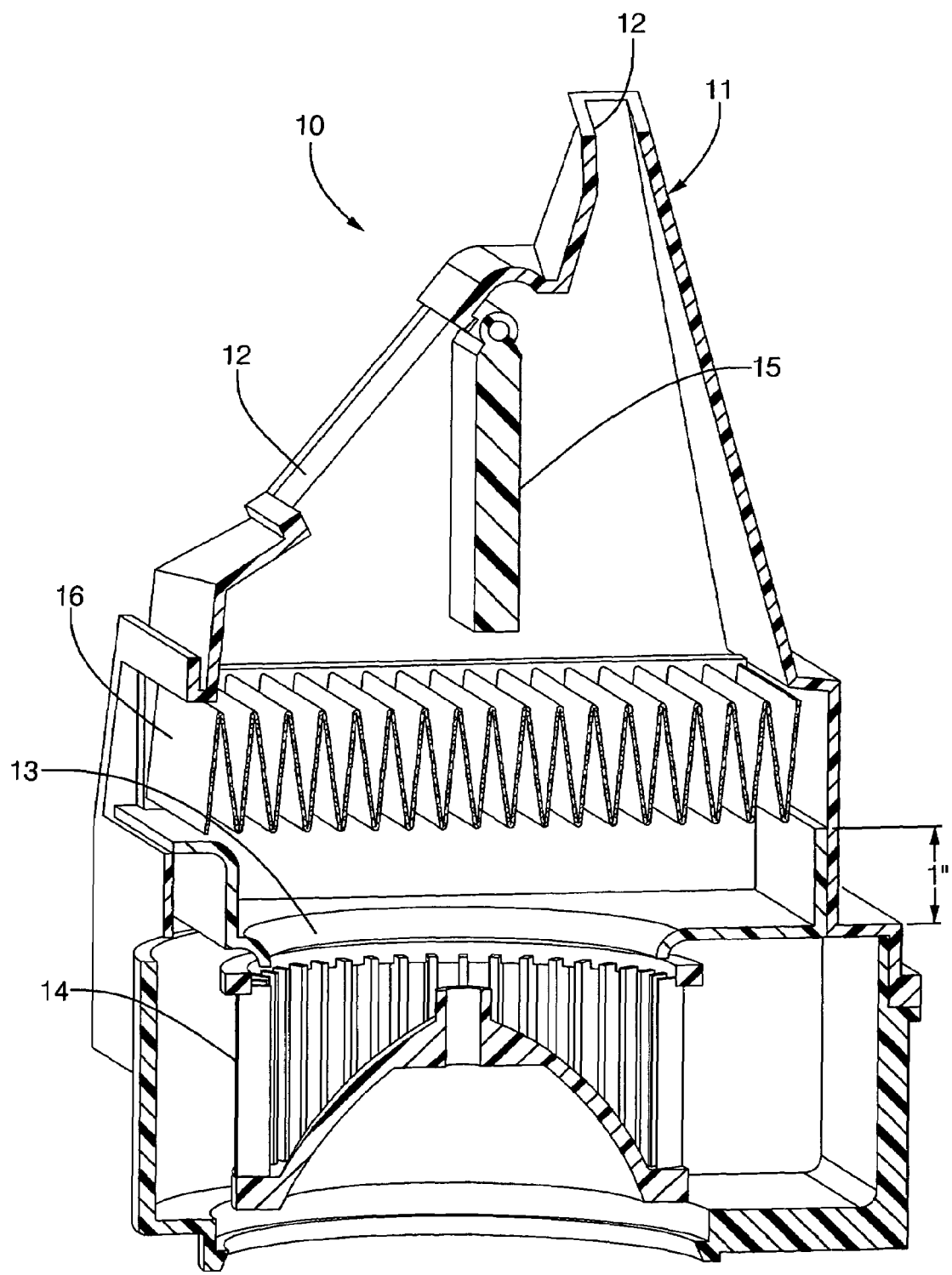
FIG. 1 is prior art and a cross-sectional view of a traditional air inlet assembly.
Figure 2:
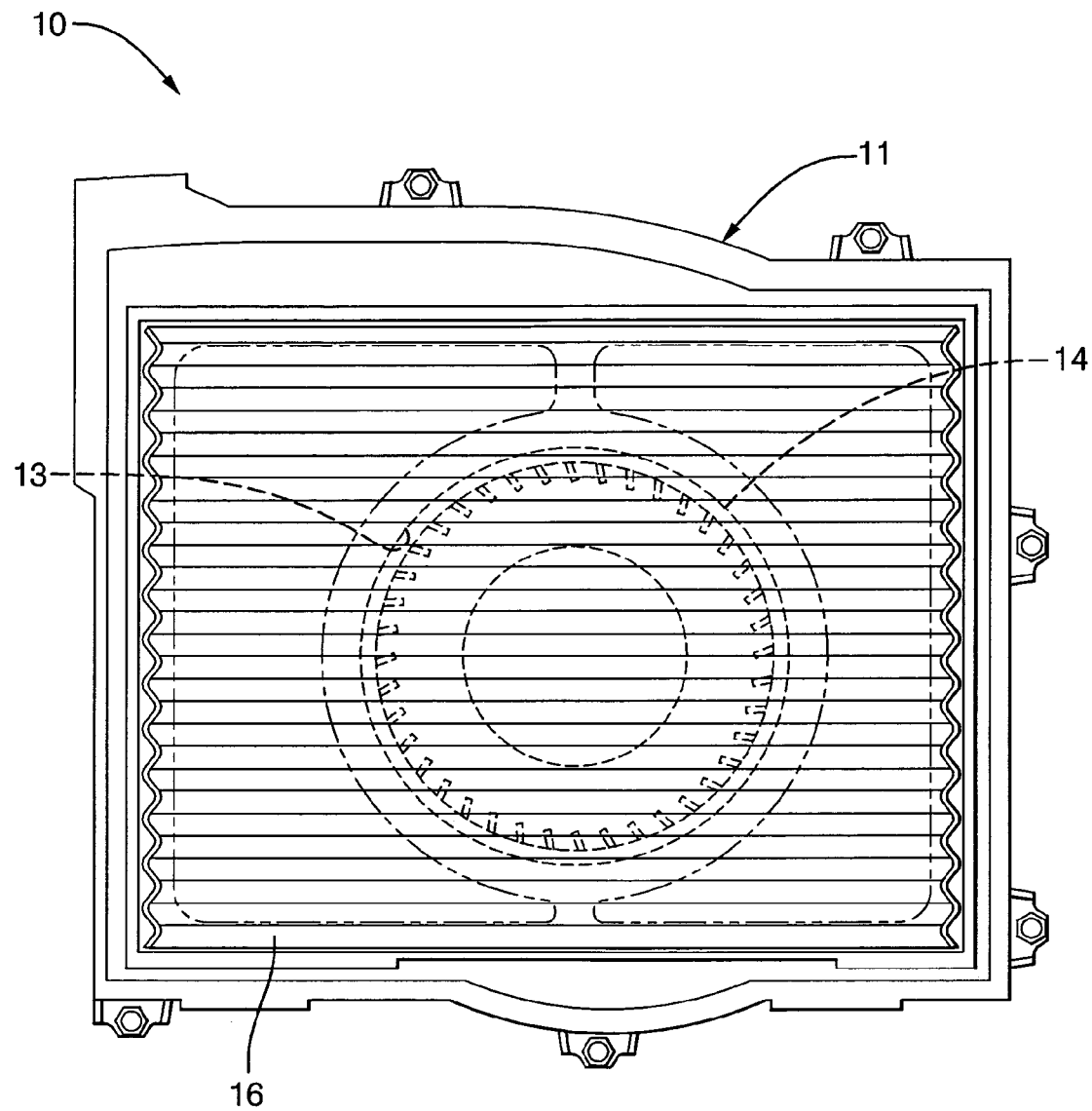
FIG. 2 is a top view of the filter shown in FIG. 1.

Referring to FIGS. 3-7, wherein like numerals indicate corresponding parts throughout the several views, an air inlet assembly 20 for an automotive heating and ventilating air conditioning (HVAC) system is generally shown. A casing 22 generally indicated extends along an axis A and includes a front section 24 and a rear section 26. The front and rear sections 24, 26 generally indicated are typically connected together using one or more mechanical connectors such as screws (not shown). Mechanical connectors, epoxy or another device may be used to connect the sections 24, 26 together.

The front section 24 includes an entrance wall and the rear section 26 includes an exit wall 30. The casing 22 defines a cabin-air inlet 32 and an outside-air inlet 34 each extending radially from the axis A and being spaced axially from one another for receiving air. The casing 22 further includes an outlet 36 having an exit diameter $d_E$ (FIG. 7) for delivering air from the inlets 32, 34. The air inlet assembly 20 includes a filter 40 having a filter diameter $d_F$ (FIG. 7) larger than the exit diameter $d_E$ of the outlet 36. The filter 40 extends cylindrically about the axis A on the filter diameter dF for filtering air between the inlets 32, 34 and the outlet 36. An air moving device, such as a blower 44, is typically disposed about the outlet 36 for expelling and/or drawing air from the casing 22.

Figure 3:
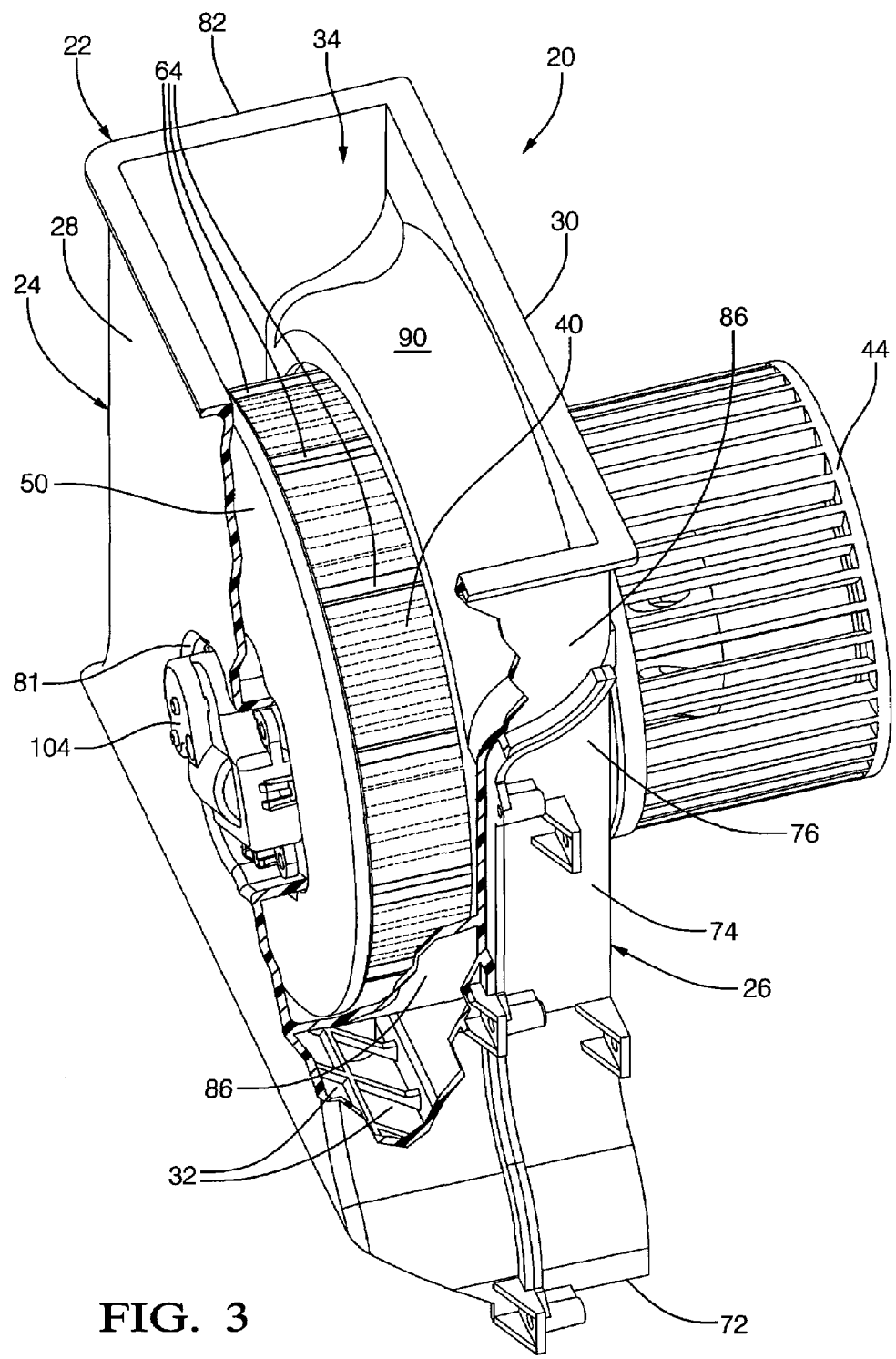
FIG. 3 is a perspective view of the air inlet assembly according to the present invention in an outside-air position.
Figure 4:
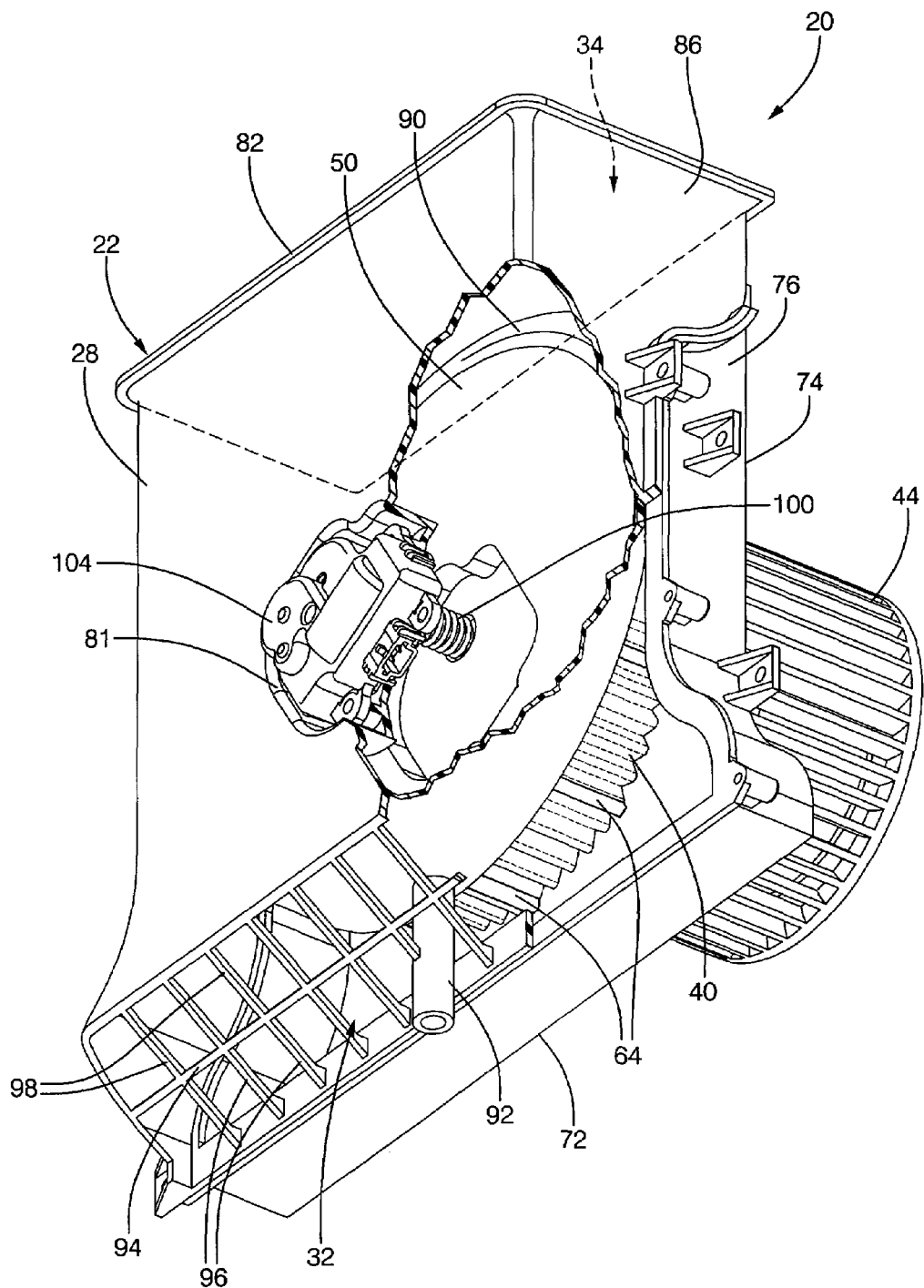
FIG. 4 is a perspective view of the air inlet assembly illustrated in FIG. 3 in a cabin-air position.
Figure 5:
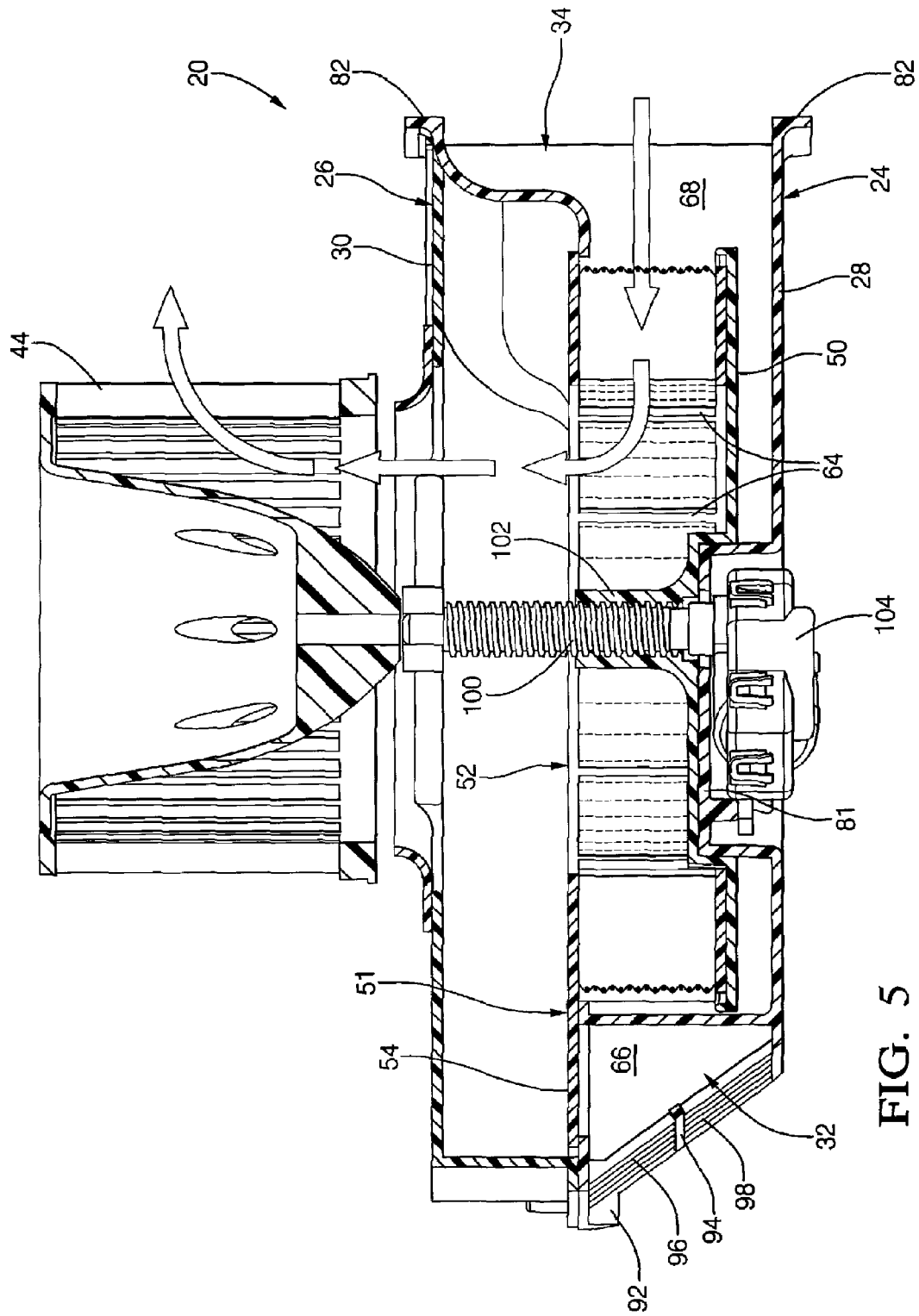
FIG. 5 is a cross-sectional view of the air inlet assembly illustrated in FIG. 3.
Figure 6:
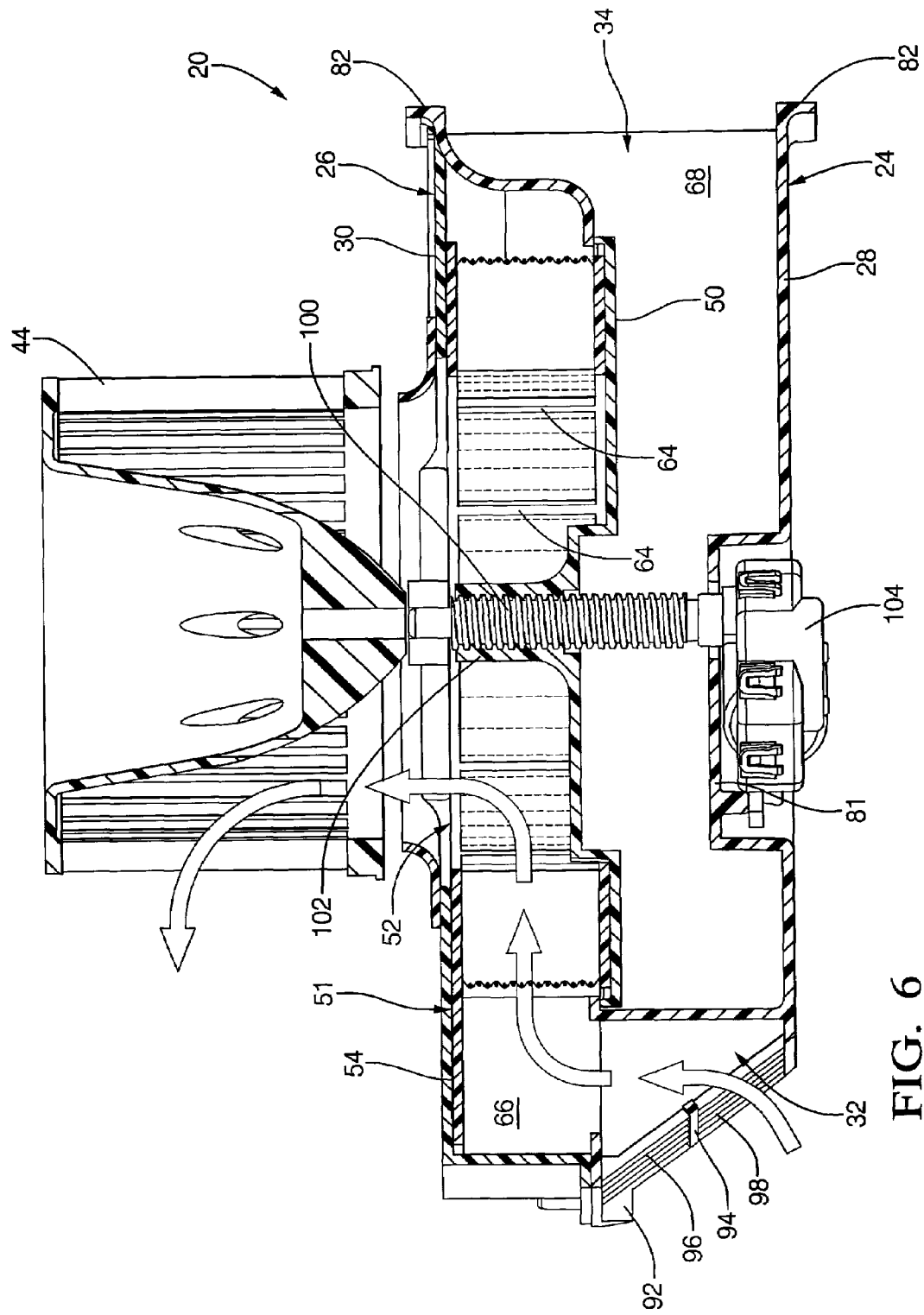
FIG. 6 is a cross-sectional view of the air inlet assembly illustrated in FIG. 4.
Figure 7:
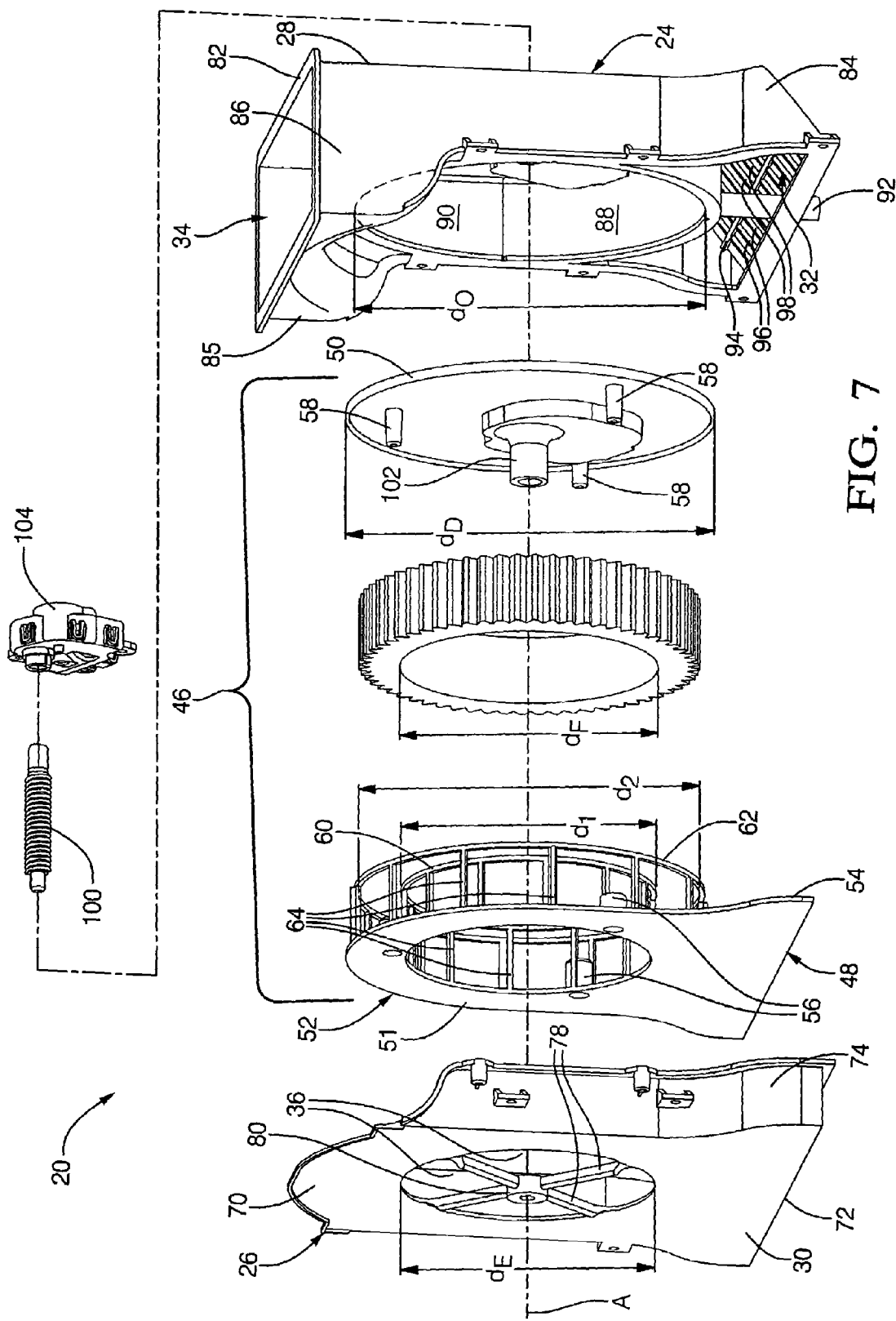
FIG. 7 is an exploded view of an air inlet assembly according to the present invention.

The invention is distinguished by a valve mechanism 46 generally indicated supporting the filter 40 and being moveable along the axis A between an outside-air position (FIG. 3 and FIG. 5) and a cabin-air position (FIG. 4 and FIG. 6). The outside-air and cabin-air positions are selected for controlling air from the inlets 32, 34 to the outlet 36. For example, the outside-air position closes the cabin-air inlet 32 while positioning the filter 40 in the air flow from the outside-air inlet 34 to the outlet 36 in the outside-air position as shown in FIG. 3 and FIG. 5. The cabin-air position closes the outside-air inlet 34 while positioning the filter 40 in the air flow from the cabin-air inlet 32 to the outlet 36 as shown in FIG. 4 and FIG. 6.

The valve mechanism 46 includes a filter-support 48 generally indicated and a disk 50. Specifically, the filter-support 48 includes a plate 51 surrounding the outlet 36 and a cage 52 generally indicated for supporting the filter 40. The plate 51 includes an axially extending flange 54. By supporting the filter 40 with the cage 52, the filter 40 can be moved axially and positioned according to the airflow, as discussed further below. The filter-support 48 includes axially extending eyelets 56 and the disk 50 includes axially extending pegs 58. The pegs 58 fit into the eyelets 56 to unite the plate 51, the filter 40, and the disk 50.

The cage 52 includes an inner ring 60 having a first diameter $d_1$ and an outer ring 62 having a second diameter $d_2$ greater than the first diameter $d_1$. The outer ring 62 encircles the inner ring 60 and a plurality of support posts 64 extends axially from each of the inner and outer rings 60, 62 to the plate 51. The support posts 64 are circumferentially spaced from one another to define a plurality of air passages for air to flow radially therethrough. The cage 52 provides an area between the inner and outer rings 60, 62 for disposing the filter 40.

The casing 22 defines the cabin-air inlet 32. The cabin-air inlet 32 extends radially outward from the filter diameter dF. The casing 22 further defines a cabin-air opening 66 extending axially from the cabin-air inlet 32. The flange 54 extends radially from the cage 52 and is selectively moveable along the axis A with the cage 52 and the filter 40. While in the outside-air position, the flange 54 moves axially in the cabin-air opening 66 for covering and closing the cabin-air inlet 32.

Similarly, the casing 22 defines the outside-air inlet 34. The outside-air inlet 34 extends radially outward from the filter diameter $d_F$. The casing 22 and entry wall 28 further define an outside-air opening 68 having an opening diameter $d_O$ and extending axially from the outside-air inlet 34. The disk 50 has a disk diameter $d_D$ larger than the opening diameter $d_O$ and extends radially about the axis A. The disk 50 selectively moves axially in the outside-air opening 68 for covering and closing the outside-air opening 68 in the cabin-air position. The cage 52 positions the filter 40 through the outside-air opening 68 against the entry wall 28 while in the outside-air position for allowing outside air to flow radially through the filter 40 and axially through the cage 52 and the outlet 36.

As stated above, the casing 22 includes a front section 24 and a rear section 26 independent of one another. The rear section 26 defines the exit wall 30 generally indicated having a rear top 70 and a rear bottom 72 and including side walls 74 having an upper wall portion 76 being scalloped inwardly. The exit wall 30 includes spokes 78 extending across the outlet 36. A rear hub 80 is located at the center of the outlet 36 and is supported by the spokes 78. The front section 24 defines the entry wall 28 and includes a front hub 81 extending radially about the axis A. The front section 24 further includes a front top 82 and a front bottom 84. A front wall 85 is spaced axially from the entry wall 28. Side panels 86 extend between the front top 82 and front bottom 84. The side panels 86 have an upper panel section and a lower panel section. The upper panel section is scalloped outwardly to engage into the inwardly scalloped upper wall portion 76 of the rear section 26. The lower panel section extends diagonally between the entry wall 28 and the front wall 85 to define the cabin-air inlet 32.

The front section 24 includes a lower cylindrical wall 88 and an upper cylindrical wall 90. The lower cylindrical wall 88 extends axially from the front wall 85 to the entry wall 28 and defines a lower section of the outside-air opening 68. The lower cylindrical wall 88 may include a drain opening (now shown) and a drain tube 92 having one end communicating with the drain opening and extending radially through the cabin-air inlet 32. Fluid, such as air and/or liquid, may be released from within the casing 22 via the drain opening and drain tube 92. The upper cylindrical wall 90 extends axially from the entry wall 28 into the outwardly scalloped upper panel portion to define the outside-air opening 68. The outside-air opening 68 extends upwardly from the lower cylindrical wall 88 beside the entry wall 28 and above the upper cylindrical wall 90. A cross-bar 94 extends between the diagonally extending side panels 86. A plurality of lower beams 96 extends between the cross-bar 94 and the front wall 85 and a plurality of upper beams 98 extends between the cross-bar 94 and the entry wall 28 to further define the cabin-air inlet 32.

A shaft 100 threaded between ends thereof is used to adjust the axial position of the filter-support 48, the filter 40 and the disk 50 along the axis A. Specifically, the disk 50 includes a threaded bushing 102 that engages the shaft 100 for axially moving the filter-support 48, the filter 40 and the disk 50 in unison. The shaft 100 can move the disk 50 over the lower cylindrical wall 88 while moving the cage 52 and filter 40 through the outside-air opening 68. The shaft 100 extends from the entry wall 28 through the front hub 81 and the bushing 102 to the exit wall 30 through the rear hub 80. An actuator, such as a motor 104, is supported on the outside of the entry wall 28 about the front hub 81. The motor 104 is connected to the shaft 100 for rotating the shaft 100. Although the motor 104 is shown supported on the outside of the entry wall 28, the motor 104 may be disposed elsewhere.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments failing within the scope of the appended claims.

What is claimed is:

1. An air inlet assembly for an automotive heating and ventilating air conditioning (HVAC) system comprising;
    a casing extending along an axis (A) and defining a plurality of inlets for receiving air and an outlet for delivering air from said inlets,
    a filter for filtering air between said inlets and said outlet,
    an air moving device disposed about said outlet for expelling air from said casing,
    a valve mechanism moveable along said axis (A) between an outside-air position and a cabin-air position for controlling air from said inlets to said outlet, and
    said valve mechanism supporting said filter for movement therewith between said positions for positioning said filter in the air flow from said inlets to said outlet.

2. An air inlet assembly as set forth in claim 1 wherein said plurality of inlets includes a cabin-air inlet and an outside-air inlet each extending radially from said axis (A) and being spaced axially from one another.

3. An air inlet assembly as set forth in claim 1 wherein said valve mechanism closes said outside-air inlet while positioning said filter in the air flow from said cabin-air inlet to said outlet in said cabin-air position and closes said cabin-air inlet while positioning said filter in the air flow from said outside-air inlet to said outlet in said outside-air position.

4. An air inlet assembly as set fourth in claim 3 wherein said filter extends cylindrically about said axis (A) on a filter diameter ($d_F$) and said valve mechanism includes a filter-support for moving said filter between said cabin-air position covering said cabin-air inlet and said outside-air position covering said outside-air inlet.

5. An air inlet assembly as set forth in claim 4 wherein said casing includes an exit wall defining said outlet about said axis (A) having an exit diameter ($d_E$) smaller than said filter diameter ($d_F$) with said filter-support including eyelets extending axially therefrom and a cage supporting said filter for positioning said filter against said exit wall about said outlet in said cabin-air position and allowing cabin air to flow radially through said filter and axially therethrough said cage and out said outlet.

6. An air inlet set forth in claim 5 wherein said casing defines said cabin-air inlet radially outward from said filter diameter ($d_F$) and a cabin-air opening extending axially from said cabin-air inlet with said filter-support including a radially extending flange movable axially with said cage and filter in said cabin-air opening for covering and closing said cabin-air opening in said outside-air position.

7. An air inlet assembly as set forth in claim 6 wherein said casing includes an entry wall defining an outside-air opening having an opening diameter ($d_O$) extending radially about said axis (A) with said cage positioning said filter through said outside-air opening against said entry wall in said outside-air position for allowing outside air to flow radially through said filter and axially through said cage and said outlet.

8. An air inlet set forth in claim 7 wherein said valve mechanism includes a disk having pegs engaging said eyelets to unite said filter-support and said filter and said disk with said disk diameter ($d_D$) being larger than said opening diameter ($d_O$) and extending radially about said axis (A) and moveable axially in said outside-air outlet for covering and closing said outside-air outlet in said cabin-air position.

9. An air inlet assembly as set forth in claim 8 wherein said casing includes a front section and a rear section independent of one another with said rear section defining said exit wall and said front section defining said entry wall.

10. An air inlet assembly as set forth in claim 9 wherein said rear section includes a rear top and a rear bottom and side walls having an upper wall portion being scalloped inwardly.

11. An air inlet assembly as set forth in claim 10 wherein said entry wall includes a front hub and a front top and a front bottom and a front wall spaced axially from said entry wall and side panels having an upper panel section being scalloped outwardly to engage into said inwardly scalloped upper wall portion of said rear section and a lower panel section extending diagonally between said entry wall and said front wall to define said cabin-air inlet.

12. An air inlet assembly as set forth in claim 11 wherein said front section includes a lower cylindrical wall extending axially from said front wall to said entry wall and defining a low section of said outside-air opening.

13. An air inlet assembly as set forth in claim 12 wherein said front section includes an upper cylindrical wall extending axially from said entry wall into said outwardly scalloped upper panel portion to define said outside-air opening extending upwardly from said lower cylindrical wall adjacent said entry wall and above said upper cylindrical wall.

14. An air inlet assembly as set forth in claim 11 further comprising a cross-bar extending between said diagonally extending side panels and a plurality of lower beams extending between said cross-bar and said front wall and a plurality of upper beams extending between said entrance cross-bar and said entrance wall to define said cabin-air inlet.

15. An air inlet assembly as set forth in claim 14 further comprising a shaft treaded between ends thereof, said disk including a bushing threadedly engaging said shaft for axially moving the cage and said disk in unison to move said disk over said lower cylindrical wall while moving said cage and filter through said outside-air opening with said shaft extending from said entry wall through said front hub and said bushing to said exit wall through said rear hub.

16. An air inlet assembly as set forth in claim 15 further comprising a motor supported on the outside of said entry wall about said front hub and connected to said shaft for rotating said shaft.

17. An air inlet assembly as set forth in claim 7 wherein said cage includes an inner ring having a first diameter ($d_1$) and an outer ring having a second diameter (d2) greater than said first diameter ($d_1$) with said outer ring encircling said inner ring and a plurality of support posts extending from said inner and outer rings to said filter-support for fixation thereto with said support posts defining a plurality of air passages for air to flow through.

18. An air inlet assembly as set forth in claim 17 wherein said filter is disposed between said inner and said outer rings overlaying said air passages.

19. An air inlet assembly as set forth in claim 15 wherein said lower cylindrical wall includes a drain opening and a drain tube having one end communicating with said drain opening and extending radially through said cabin-air inlet.

20. An air inlet assembly as set forth in claim 9 further comprising at least one mechanical connector between said front section and said rear section for connecting said front and rear sections together with said side walls abutting said side panels.

21. An air inlet assembly as set forth in claim 1 wherein said air moving device is a blower.

22. An air inlet assembly for an automotive heating and ventilating air conditioning (HVAC) system comprising;
   a casing extending along an axis (A) and defining a cabin-air inlet and an outside-air inlet each extending radially from said axis (A) and being spaced axially from one another for receiving air and an outlet for delivering air from said inlets,
   a filter extending cylindrically about said axis (A) on a filter diameter ($d_F$) for filtering air between said inlets and said outlet,
   a blower disposed about said outlet for expelling air from said casing,
   a valve mechanism moveable along said axis (A) between an outside-air position and a cabin-air position for controlling air from said inlets to said outlet by closing said outside-air inlet and by closing said cabin-air inlet,
   said valve mechanism supporting said filter for movement therewith between said positions for positioning said filter in the air flow from said cabin-air inlet to said outlet in said cabin-air position and positioning said filter in the air flow from said outside-air inlet to said outlet in said outside-air position,
   said valve mechanism including a filter-support for moving said filter between said cabin-air position covering said cabin-air inlet and said outside-air position covering said outside-air inlet,
   said casing including an exit wall defining said outlet about said axis (A) having an exit diameter ($d_E$) smaller than said filter diameter ($d_F$), said filter-support including a plate surrounding said outlet and a cage supporting said filter for positioning said filter against said exit wall about said outlet in said cabin-air position and allowing cabin air to flow radially through said filter and axially through said cage and out said outlet, said casing defining said cabin-air inlet radially outward from said filter diameter ($d_F$) and a cabin-air opening extending axially from said cabin-air inlet, said filter-support including a radially extending flange being moveable axially with said cage and filter in said cabin-air inlet for covering and closing said cabin-air inlet in said outside-air position, said casing defining said outside-air inlet radially outward from said filter diameter ($d_F$) and an outside-air opening having an opening diameter ($d_O$) and extending axially from said outside-air inlet, said valve mechanism including a disk having a disk diameter ($d_D$) larger than said opening diameter ($d_O$) and extending radially about said axis (A) and moveable axially in said outside-air opening for covering and closing said outside-air opening in said cabin-air position, said plate including eyelets extending axially therefrom, said disk including pegs engaging said eyelets to unite said plate and said disk, said casing including an entry wall defining said outside-air opening, said cage positioning said filter through said outside-air opening against said entry wall in said outside-air position for allowing outside air to flow radially through said filter and axially through said cage and said outlet, said casing including a front section and a rear section independent of one another, said rear section defining an exit wall having a rear top and a rear bottom and including side walls having an upper wall portion being scalloped inwardly, said exit wall including spokes extending across said outlet and a hub supported centrally of said outlet by said spokes, said front section defining said entry wall including a front hub and having a front top and a front bottom and including a front wall spaced axially from said entry wall and side panels having an upper panel section being scalloped outwardly to engage into said inwardly scalloped upper wall portion of said rear section and a lower panel section extending diagonally between said entry wall and said front wall to define said cabin-air inlet, said front section including a lower cylindrical wall extending axially from said front wall to said entry wall and defining a lower section of said outside-air opening, said front section including an upper cylindrical wall extending axially from said entry wall into said outwardly scalloped upper panel portion to define said outside-air opening extending upwardly from said lower cylindrical wall beside said entry wall and above said upper cylindrical wall, said entry wall including a cross-bar extending between said diagonally extending side panels and a plurality of lower beams extending between said cross-bar and said front wall and a plurality of upper beams extending between said cross-bar and said entrance wall to define said cabin-air inlet, said lower cylindrical wall including a drain opening and a drain tube having one end communicating with said drain opening and extending radially through said cabin-air inlet, said cage including an inner ring having a first diameter ($d_1$) and an outer ring having a second diameter ($d_2$) greater than said first diameter ($d_1$) encircling said inner ring and a plurality of support posts extending axially from each of said inner and outer rings to said plate and being circumferentially spaced from one another to define a plurality of air passages for air to flow radially therethrough, said filter being disposed between said inner and outer rings, a shaft threaded between ends thereof, said disk including a bushing threadedly engaging said shaft for axially moving said cage and said disk in unison to move said disk over said lower cylindrical wall while moving said cage and filter through said outside-air opening, said shaft extending from said entry wall through said front hub and said bushing to said exit wall through said rear hub, a motor supported on the outside of said entry wall about said front hub and connected to said shaft for rotating said shaft, and at least one mechanical connector between said front section and said rear section for connecting said front and rear sections together with said side walls abutting said side panels.

* * * * *